(12) United States Patent
Lee et al.

(10) Patent No.: US 8,599,339 B2
(45) Date of Patent: Dec. 3, 2013

(54) COMPENSATION FILM, MANUFACTURING METHOD THEREOF AND LIQUID CRYSTAL DISPLAY USING THE SAME

(75) Inventors: Man Hoan Lee, Seoul (KR); Ha Young Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 10/878,030

(22) Filed: Jun. 29, 2004

(65) Prior Publication Data

US 2005/0140880 A1   Jun. 30, 2005

(30) Foreign Application Priority Data

Dec. 30, 2003  (KR) .......................... 10-2003-100363

(51) Int. Cl.
*G02F 1/1335* (2006.01)
*G02F 1/1337* (2006.01)

(52) U.S. Cl.
USPC .......................... 349/117; 349/129; 349/136

(58) Field of Classification Search
USPC ............. 349/117–119, 123–136; 428/1.1–1.2
See application file for complete search history.

(56) References Cited

U.S. PATENT DOCUMENTS

| | | | |
|---|---|---|---|
| 5,184,237 A * | 2/1993 | Iimura et al. .................. 349/119 |
| 5,570,211 A * | 10/1996 | Hanaoka et al. ................ 349/74 |
| 5,619,352 A | 4/1997 | Koch et al. |
| 5,986,733 A * | 11/1999 | Winker et al. ................. 349/120 |
| 6,011,603 A * | 1/2000 | Lee .................................. 349/75 |
| 6,411,355 B1 * | 6/2002 | Manabe et al. ................ 349/120 |
| 6,750,928 B2 * | 6/2004 | Hiji et al. ......................... 349/74 |
| 6,809,788 B2 * | 10/2004 | Yamada et al. ............... 349/129 |
| 6,831,722 B2 * | 12/2004 | Ishikawa et al. ............. 349/117 |
| 6,852,375 B2 * | 2/2005 | Kobayashi et al. ............ 428/1.3 |
| 2001/0055076 A1 * | 12/2001 | Ochi et al. ....................... 349/63 |
| 2002/0187283 A1 * | 12/2002 | Gu et al. ......................... 428/1.2 |
| 2003/0193637 A1 | 10/2003 | Mi et al. |

FOREIGN PATENT DOCUMENTS

| | | |
|---|---|---|
| DE | 69715391 T | 7/2003 |
| EP | 0423881 | 4/1994 |
| EP | 0689084 B1 | 12/1995 |
| JP | 06250166 | 9/1994 |
| JP | 09-061624 | 3/1997 |
| JP | 2002-214610 A | 7/2002 |
| WO | WO 96/06380 | 2/1996 |
| WO | WO 97/44702 | 11/1997 |

* cited by examiner

*Primary Examiner* — Dung Nguyen
(74) *Attorney, Agent, or Firm* — McKenna, Long & Aldridge, LLP.

(57) ABSTRACT

Disclosed is a compensation film, a manufacturing method thereof and a liquid crystal display, which can obtain a wider viewing angle. The liquid crystal display can secure a wider viewing angle by providing the compensation film formed of multi-layered cholesteric liquid crystal layers.

8 Claims, 7 Drawing Sheets

$n_x = n_y > n_z$ $n_x > n_z > n_y$ $n_x > n_y > n_z$

COMPENSATION FILM, MANUFACTURING METHOD THEREOF AND LIQUID CRYSTAL DISPLAY USING THE SAME

This application claims the benefit of Korean Patent Application No. 2003-100363, filed on Dec. 30, 2003, which is hereby incorporated by reference for all purposes as if fully set forth herein.

BACKGROUND OF THE INVENTION

1. Field of the Invention

The present invention relates to a liquid crystal display, and more particularly, to a compensation film, a manufacturing method thereof and a liquid crystal display using the same.

2. Discussion of the Related Art

According to a recent rapid advance to information society, a flat panel display is required to have an excellent characteristics such as slimness, light weight and low power consumption.

A Liquid Crystal Display (LCD), one of the flat panel displays, has an excellent visibility in comparison with a Cathode Ray Tube (CRT) and has low average power consumption and caloric value in comparison with a CRT having the same screen size. For these reasons, LCDs are used in portable phones, computer monitors, television sets and the like and highlighted as next-generation display together with Plasma Display Panels (PDP) and Field Emission Displays (FED).

Generally, as LCD includes two substrates on which electric-field generation electrodes are formed. The two substrates are arranged to face each other and liquid crystal material is injected between the two substrates. An electric field is induced by a predetermined voltage, which is applied to the electric-field generation electrodes. By controlling liquid crystal molecules according to the electric field, light transmittance is controlled. Through these procedures, images are displayed on the LCD.

Generally, liquid crystal molecules are aligned anisotropically. The liquid crystal molecules have a property such that the anisotropy of the liquid crystal molecules changes depending on a distribution degree of liquid crystal molecules and a distribution degree of tilt angles with respect to the substrate. Accordingly, such a property of the liquid crystal is an important factor that causes a polarization to be changed depending on a viewing angle of the liquid crystal cell or the film.

In driving the LCD panel, such an inherent property of the liquid crystal molecules causes a luminance and a contrast ratio to be changed depending on the omni-directional viewing angles. Therefore, the LCDs have problems that cannot obtain a constant luminance and contrast ratio through a range of viewing angles.

In order to overcome the foregoing problems, a compensation film has been proposed for compensating for anisotropic distribution depending on the viewing angle of the liquid crystal cell.

In the compensation film, a phase difference with respect to a transmitted light is varied by a polymer film. Also, the compensation film extends in a predetermined direction to have birefringence due to anisotropic induction of the molecules.

For example, when an external electric field is applied to a Twisted Nematic (TN) mode liquid crystal display having a normally black mode, the liquid crystal molecules respond to the applied electric field and provide light transmittance like a following equation.

$$I = I_o \sin^2[\theta(1+u^2)^{1/2}],$$

$$U = \pi R/\theta\lambda,$$

$$R = \Delta n \cdot d \quad \text{[Equation]}$$

where,
I: an intensity of a transmitted light
$I_o$: an intensity of an incident light
$\Delta n$: a birefringence
d: a thickness of a liquid crystal cell
$\lambda$: a wavelength of a transmitted light
$\theta$: a twist angle of a TN liquid crystal
R: a phase difference.

That is, when light passes through the liquid crystal molecules in a vertical direction and in an oblique direction, values of the phase differences are different from one another. Thus, the properties of the transmitted light are changed depending on the viewing angle.

A birefringence value ($\Delta n \cdot d$) of the light passing through the liquid crystal is evaluated by multiplying a difference value of refractive index on a plane perpendicular to a light forwarding direction by a thickness of a medium through which the light passes.

In order to compensate for the phase difference of the liquid crystal, the compensation film with a liquid crystal layer constructed to have a birefringence value almost identical with a birefringence value ($d*(n_e-n_o)$) of the liquid crystal and to have a negative phase value ($n_e-n_o$) can be used to compensate the viewing angle.

Accordingly, the viewing angle problem can be solved by compensating for the phase difference in an opposite direction in the compensation film, which is installed between the liquid crystal substrate and the polarizing plate in order to compensate for the phase difference inside the liquid crystals. At this time, a uniaxial film or a biaxial film is used as the compensation film.

FIGS. 1A to 1C are views illustrating a refractive-index anisotropic ellipsoid of a phase-difference compensation film.

As illustrated in FIGS. 1A to 1C, assuming that X-, Y-, and Z-direction refractive indices are respectively expressed as "$n_x$", "$n_y$" and "$n_z$", uniaxiality and biaxiality are determined depending on whether or not the X-direction refractive index "$n_x$" is identical with the Y-direction refractive index "$n_y$". That is, as illustrated in FIG. 1A, the uniaxiality refers to a case where refractive indices of two directions (X- and Y-directions) are equal to each other but different from a refractive index of the remaining direction (Z-direction). Additionally, as shown in FIGS. 1B and 1C, the biaxiality refers to a case where refractive indices of three directions (X-, Y- and Z-directions) are different from one another.

The general phase-difference compensation film using the uniaxial refractive-index anisotropic body is aligned such that a long axes of the ellipsoid are in parallel with and perpendicular with a surface of the phase-difference film.

A conventional manufacturing method of the phase-difference film uses a method of extending a high molecular film uniaxially or biaxially to allow a light axis of the phase-difference film to have a predetermined angle with respect to a film forwarding direction, thereby obtaining a the desired birefringence.

FIG. 2 is a view schematically showing a structure of a conventional LCD with a compensation film.

Referring to FIG. 2, the conventional LCD includes a liquid crystal panel 20 formed by injecting a liquid crystal layer 10 between the upper and lower substrates 11 and 12, in which upper and lower substrates 11 and 12 are spaced apart from each other by a predetermined distance; first and second compensation films 13 and 14 attached to outer surfaces of the upper and lower substrates 11 and 12; and first and second polarizing plates 15 and 16 attached to the compensation films 13 and 14 to have optical transmittance axes perpendicular to each other.

At this time, since the compensation films 13 and 14 have an anisotropic distribution with opposite direction to liquid crystal cells of the liquid crystal layer, it is possible to eliminate a difference of light retardation according to a viewing angle when using the compensation film attached to the liquid crystal cells.

FIG. 3 is a view schematically showing a structure of the compensation film of FIG. 2.

As shown, the compensation film has a refractive index anisotropy by arranging discotic liquid crystals 17 to change tilt angles successively. At this time, the discotic liquid crystals 13 can be formed using a splay alignment.

However, the conventional compensation film provided in the LCD has a limit that a wider viewing angle cannot be obtained because it is difficult to make the discotic liquid crystals have successive tilt angles different from each other.

SUMMARY OF THE INVENTION

Accordingly, the present invention is directed to a compensation film and an LCD having the same that substantially obviate one or more problems due to limitations and disadvantages of the related art.

An advantage of the present invention is to provide a compensation film, a manufacturing method thereof, and an LCD using the same, in which a wider viewing angle is obtained by forming the compensation film with a multi-layered structure of a coating-type cholesteric liquid crystal.

Additional advantages, and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a compensation film comprises a plurality of alignment films formed on a substrate, the alignment films having different tilt angles; and a plurality of liquid crystal layers formed by coating cholesteric liquid crystals on each of the alignment films.

The cholesteric liquid crystal layer may be formed with a multi-layered structure having at least three layers.

According to another embodiment of the present invention, a method for manufacturing a compensation film comprises: a) printing, hardening and aligning an optical alignment film on a substrate; b) coating a cholesteric liquid crystal layer on the aligned optical alignment film and hardening the cholesteric liquid crystal layer; and c) repeatedly performing the steps a) and b) to provide multi-layered cholesteric liquid crystal layers.

Here, the multi-layered cholesteric liquid crystal layers have successive tilt angles different from each other.

According to a further another embodiment of the present invention, a liquid crystal display, comprises: a lower substrate having thin film transistors arranged in a matrix, pixel regions being defined by gate lines and data lines; an upper substrate provided corresponding to the lower substrate, the upper substrate having a plurality of color filter patterns for representing colors; a liquid crystal layer provided by filling liquid crystals into a gap between the lower and upper substrates; first and second compensation films provided by coating multi-layered cholesteric liquid crystal layers on outer surfaces of the lower and upper substrates; and first and second polarizing plates respectively attached to outer surfaces of the lower and upper substrates to have optical transmittance axes perpendicular to each other.

The first and second compensation films are formed of negative C-plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1A:
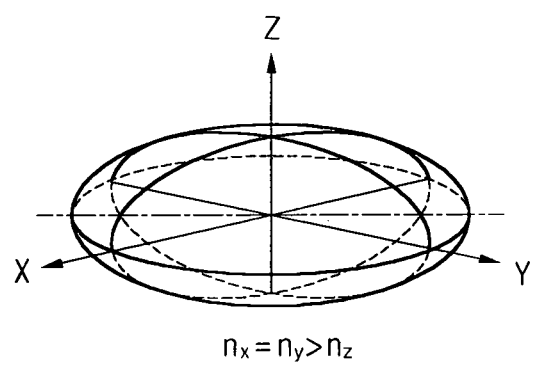
FIGS. 1A to 1C are views illustrating refractive index anisotropic ellipsoids of a phase-difference compensation film.
Figure 1B:
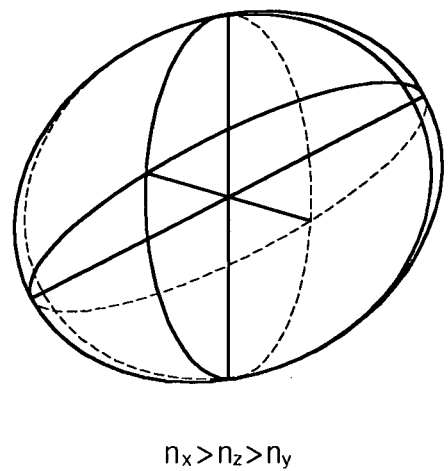
Figure 1C:
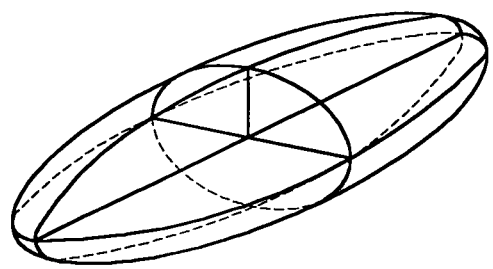
Figure 2:
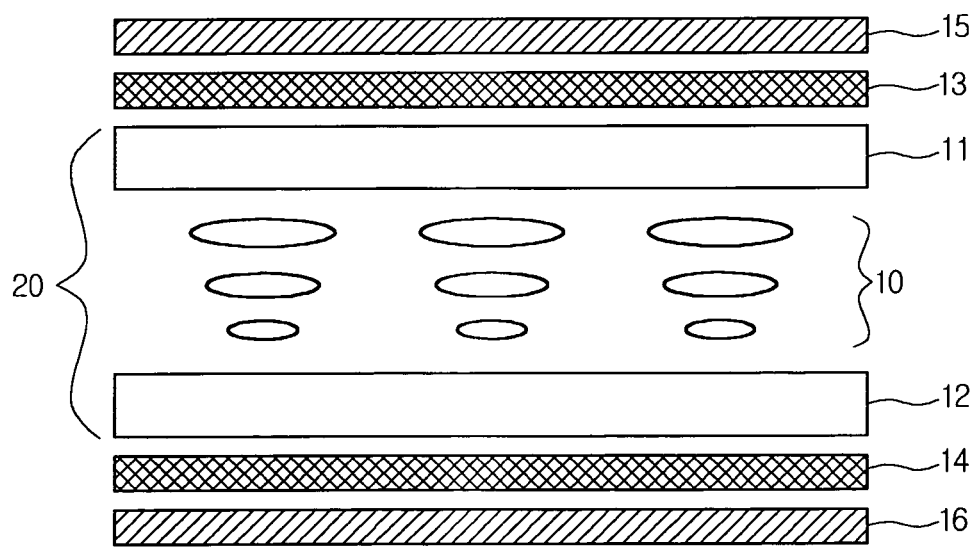
FIG. 2 is a view schematically a structure of an LCD with a conventional compensation film.
Figure 3:
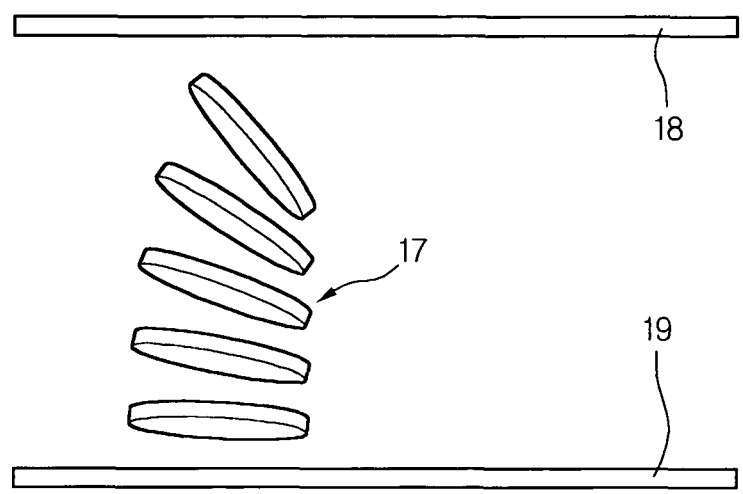
FIG. 3 is a view schematically illustrating a structure of the compensation film of FIG. 2.
Figure 4:
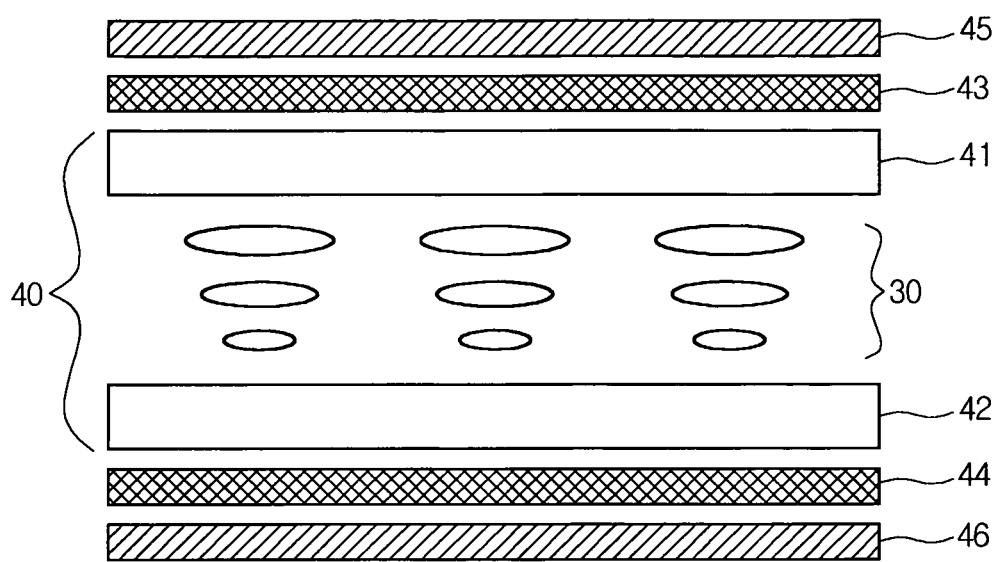
FIG. 4 is a view schematically illustrating a structure of an LCD with a compensation film according to an embodiment of the present invention.

FIG. 4 is a view schematically illustrating a structure of an LCD with a compensation film according to one embodiment of the present invention.

Referring to FIG. 4, pixel regions are defined by gate lines and data lines (not shown). A lower substrate 42 includes thin film transistors (TFTs) (not shown) arranged in a matrix. An upper substrate 41 is provided corresponding to the lower substrate 42 and includes a color filter (not shown) with a plurality of color filter patterns for representing colors. A liquid crystal layer 30 is provided by filling liquid crystals into a gap between the lower substrate 42 and the upper substrate 41. First and second compensation films 43 and 44 are formed by coating multi-layered cholesteric liquid crystal layers on respective outer surfaces of the lower and upper substrates 42 and 41. First and second polarizing plates 45 and 46 are respectively attached to the outer surfaces of the upper and lower substrates 41 and 42 to have optical transmittance axes perpendicular to each other.

Although not shown in FIG. 4, TFTs acting as switching elements are formed at crossings of the gate lines and the data lines, and pixel electrodes connected to drain electrodes of the TFTs are formed at the pixel regions, which are defined by the gate lines and the data lines.

Here, the TFTs formed on the lower substrate 42 may be amorphous silicon type TFTs or polysilicon type TFTs or other type as would be appreciated by one of skill in the art. The amorphous silicon type TFT may include hydrogen having no periodicity of lattice according to a crystal state of a semiconductor layer, which is an active layer. The polysilicon type TFT may include crystalline polysilicon.

In addition, in Twisted Nematic (TN) mode, black matrix (BM) (not shown) is formed on a transparent substrate in order to shield light from transmitting through a region except for the pixel electrode. Red, green and blue color filter patterns are formed on the black matrix to represent colors. A common electrode is formed on the color filter patterns.

A liquid crystal mode of the liquid crystal layer 30 may be Twisted Nematic (TN) mode, Optical Compensated Birefringence (OCB) mode, Vertical Alignment (VA) mode, In Plane Switching (IPS) mode or Electrically Controlled Birefringence (ECB) mode.

Figure 5:
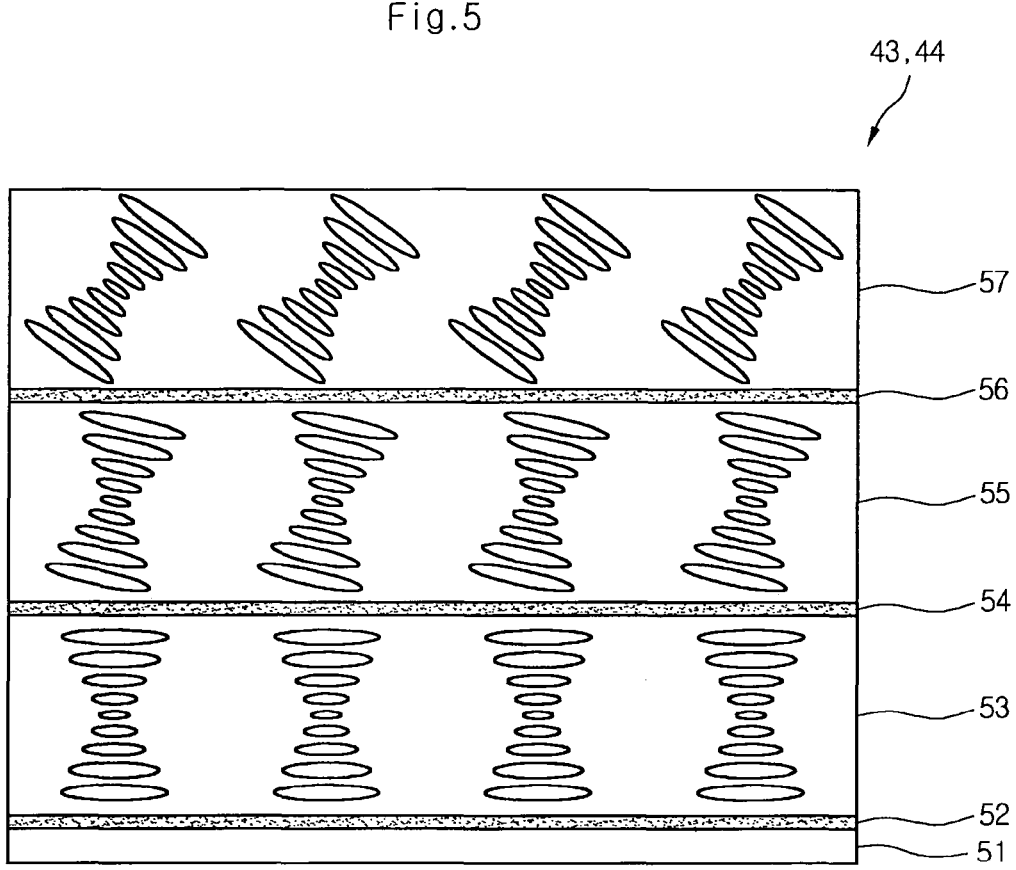
FIG. 5 is a view schematically illustrating a structure of the compensation film of FIG. 3, which uses cholesteric liquid crystal.

FIG. 5 is a view schematically illustrating a structure of the compensation film of FIG. 4 using cholesteric liquid crystals.

Referring to FIG. 5, each of the compensation films 43 and 44 includes a substrate 51; a first alignment film 52 formed on the substrate 51 and having a first tilt angle; a first liquid crystal layer 53 formed by coating cholesteric liquid crystals on the first alignment film 52; a second alignment film 54 formed on the first liquid crystal layer 53 and having a second tilt angle; a second liquid crystal layer 55 formed by coating cholesteric liquid crystals on the second alignment film 54; a third alignment film 56 formed on the second liquid crystal layer 55 and having a third tilt angle; and a third liquid crystal layer 57 formed by coating cholesteric liquid crystals on the third alignment film 56.

The liquid crystal layers 53, 55 and 57 formed by coating the cholesteric liquid crystals may be formed with a multi-layered structure having at least three layers. The first alignment film 52, the second alignment film 54 and the third alignment film 56 corresponding to the liquid crystal layers may be formed with a multi-layered structure having at least three layers. Each of the alignment films are stacked up over each of the liquid crystal layers. The alignment films having different tilt angles are respectively formed on the liquid crystal layers. At this time, since the respective liquid crystal layers 53, 55 and 57 of the multi-layered structure have different tilt angles, the tilt angle can be changed successively.

Meanwhile, the compensation films 43 and 44 need to have negative birefringence and inclined optical transmittance axes in order to compensation for positive birefringence of the liquid crystal layer 30, or vice versa.

The cholesteric liquid crystals have a selective reflection characteristic that reflects a specific wavelength of incident light according to a helical pitch. At this time, a polarization state of the reflective light is determined according to a rotating direction of the liquid crystal. For example, if liquid crystal molecules have a left-handed structure, that is, if the liquid crystal molecules are rotated and twisted in a counter-clockwise direction around an axis of rotation, only left-circle polarized light is reflected.

Accordingly, the present invention controls the pitch to change phases of the cholesteric liquid crystals in the visible light range, thereby providing the same effect as discotic liquid crystals.

Figure 6A:
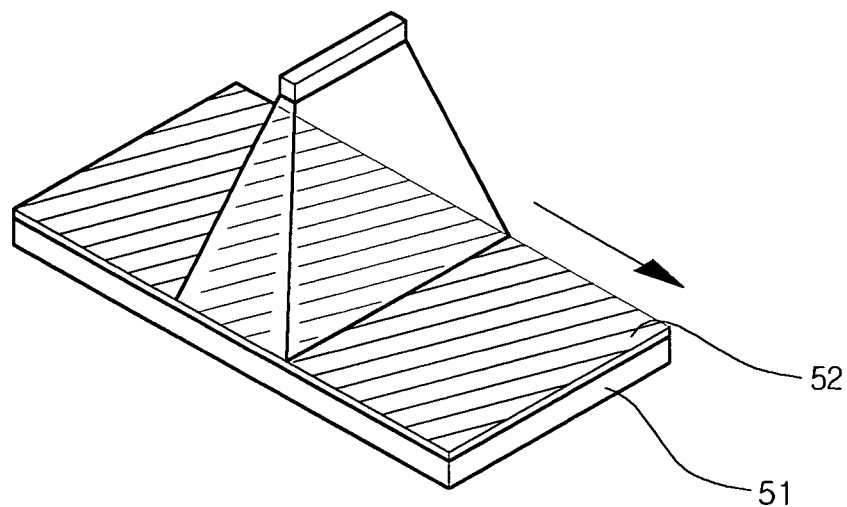
FIGS. 6A to 6C are views illustrating sequential procedures of manufacturing the compensation film according to an embodiment of the present invention.
Figure 6B:
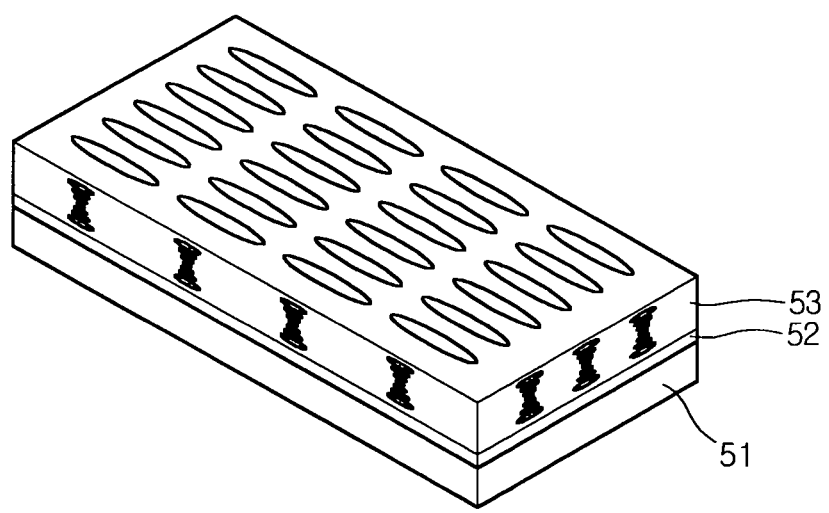
Figure 6C:
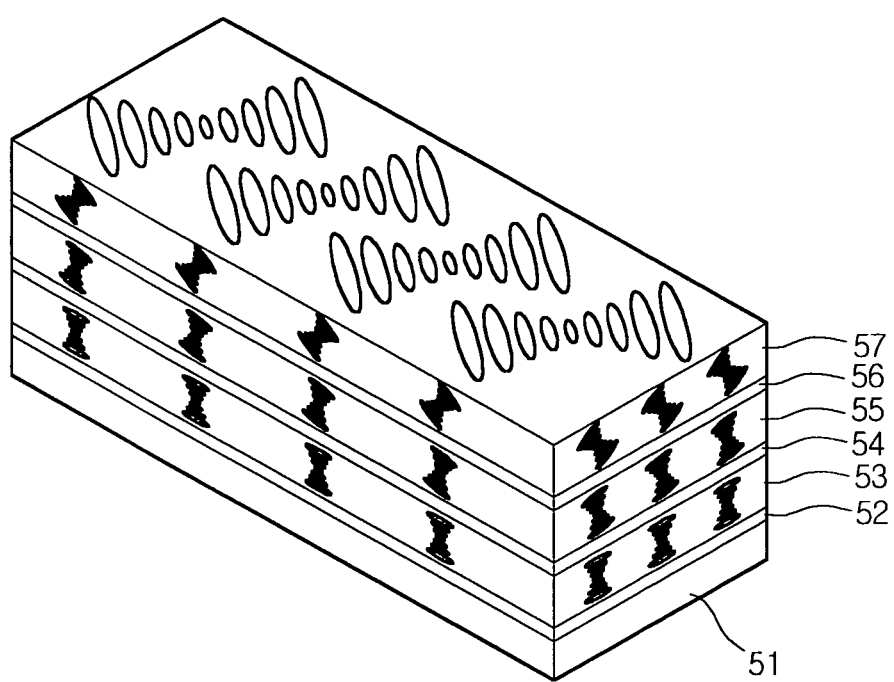

FIGS. 6A to 6C are views illustrating sequential procedures of manufacturing the compensation film according to an embodiment of the present invention.

As illustrated in FIG. 6A, for the purpose of aligning liquid crystal molecules, organic polymer which is referred to as an optical alignment film 52 is coated on a transparent substrate 51 and then aligned after evaporating solvent at temperature of approximately 60° C. to 80° C. Thereafter, the optical alignment film 52 is hardened at temperature of approximately 80° C. to 200° C. Here, polyimide-based organic matter can be as material for the optical alignment film 52.

Then, the optical alignment film 52 is oriented by applying non-polarized ultraviolet (UV) light or irradiating ion beam. Specifically, the optical axis of the compensation film manufactured by arbitrarily controlling an orientation direction of the optical alignment film has an arbitrary angle with respect to a progress direction of the film. In addition, the process of orienting the optical alignment film may be carried out using a rubbing process.

As illustrated in FIG. 6B, a cholesteric liquid crystal layer 53 for a coatable retarder is coated on the oriented optical alignment film 52.

In detail, the cholesteric liquid crystal layer 53 can be formed by a roll coating process that uses a roller. The cholesteric liquid crystal layer 53 has uniform thickness by planarizing its surface.

The coated cholesteric liquid crystal layer 53 is hardened using non-polarized ultraviolet (UV) light or ion beams and is fixed as a film.

At this time, the pitch of the cholesteric liquid crystal layer 53 can be determined by controlling its thickness and the irradiated an ultraviolet (UV) light.

As illustrated in FIG. 6C, optical alignment films 54 and 56 having different tilt angles and cholesteric liquid crystal layers 55 and 57 are further formed on the cholesteric liquid crystal layer 53.

At this time, the cholesteric liquid crystal layers 55 and 57 having the different tilt angle can be formed by repeating the above-described steps of FIGS. 6A and 6B.

As a result, a negative C-plate is completed by forming the cholesteric liquid crystal layers 53, 55 and 57 with a multi-layered structure having successive tilt angles different from each other.

In addition, optical alignment films having successive tilt angles and cholesteric liquid crystal layers can be further formed on the cholesteric liquid crystal layers 53, 55 and 57. In other words, if necessary, the cholesteric liquid crystal layers may be formed with at least three layers.

Meanwhile, if the cholesteric liquid crystal layers 53, 55 and 57 are formed with a reactive mesogen characteristic, tilt angles can be directly determined in the cholesteric liquid crystal layers without forming any additional alignment films.

Because the compensation film according to the present invention has an anisotropic distribution of possible opposite direction to liquid crystal cells of the liquid crystal layer, a wider viewing angle can be secured by eliminating a difference of light retardation according to a viewing angle when using the compensation film attached to the liquid crystal cells.

As described above, the present invention can obtain a wider viewing angle by eliminating light retardation according to a viewing angle using the compensation film, which is formed with the multi-layered coating-type cholesteric liquid crystal layer.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A compensation film for a liquid crystal display device, comprising:
    a plurality of alignment films formed on a substrate, the alignment films having different tilt angles changed successively; and
    a plurality of liquid crystal layers, each formed by coating cholesteric liquid crystals on each of the alignment films,
    wherein a pretilt angle of each of the liquid crystal layers is set from each of the alignment films,
    wherein the cholesteric liquid crystal layers are formed with a multi-layered structure having at least three layers, each cholesteric liquid crystal layer has a substantially fixed tilt angle, and the tilt angles of the cholesteric liquid crystal layers are different from each other and change successively throughout the cholesteric liquid crystal layers,
    wherein the alignment films layers are formed with a multi-layered structure having at least three layers,
    wherein the cholesteric liquid crystal layers are hardened by ultraviolet light or ion beams and each of the cholesteric liquid crystal layers are fixed as a film, and
    wherein a pitch of the cholesteric liquid crystals is controlled so as to change a phase of the cholesteric liquid crystals in the visible ray range.

2. A method for manufacturing a compensation film for a liquid crystal display device, comprising:
    a) printing, hardening and aligning an optical alignment film on a substrate;
    b) coating a cholesteric liquid crystal layer on the aligned optical alignment film and hardening the cholesteric liquid crystal layer by ultraviolet light or ion beams, wherein each of the cholesteric liquid crystal layers are fixed as a film; and
    c) repeatedly performing the steps a) and b) to provide sequentially a plurality of optical alignment films and a plurality of cholesteric liquid crystal layers formed on each of the optical alignment films,
    wherein the optical alignment films have different tilt angles changed successively;
    wherein a pretilt angle of each of the cholesteric liquid crystal layers is set from each of the optical alignment films,
    wherein the cholesteric liquid crystal layers are formed with a multi-layered structure having at least three layers, and each cholesteric liquid crystal layer has a substantially fixed tilt angle, and the tilt angles of the cholesteric liquid crystal layers are different from each other and change successively throughout the cholesteric liquid crystal layers,
    wherein the optical alignment films layers are formed with a multi-layered structure having at least three layers, and
    wherein a pitch of the cholesteric liquid crystal is controlled so as to change a phase of the cholesteric liquid crystal in the visible ray range.

3. The method according to claim 2, wherein the aligning of the optical alignment film is carried out by irradiating at least one of non-polarized ultraviolet light and an ion beam.

4. A liquid crystal display, comprising:
    a lower substrate having thin film transistors arranged in a matrix, pixel regions being defined by gate lines and data lines;
    an upper substrate provided corresponding to the lower substrate, the upper substrate having a plurality of color filter patterns for representing colors;
    a liquid crystal layer provided by filling liquid crystals into a gap between the lower and upper substrates;
    first and second compensation films, each provided by forming sequentially a plurality of alignment films and a plurality of cholesteric liquid crystal layers formed on each of the alignment films on outer surfaces of the lower and upper substrates, the alignment films having different tilt angles changed successively; and
    first and second polarizing plates respectively attached to outer surfaces of the lower and upper substrates to have optical transmittance axes perpendicular to each other,
    wherein a pretilt angle of each of the cholesteric liquid crystal layers is set from each of the alignment films,
    wherein the cholesteric liquid crystal layers are formed with a multi-layered structure having at least three layers, and each cholesteric liquid crystal layer has a substantially fixed tilt angle, and the tilt angles of the cholesteric liquid crystal layers are different from each other and change successively throughout the cholesteric liquid crystal layers,
    wherein the alignment films layers are formed with a multi-layered structure having at least three layers,
    wherein the cholesteric liquid crystal layers are hardened by ultraviolet light or ion beams and each of the cholesteric liquid crystal layers are fixed as a film, and
    wherein a pitch of the cholesteric liquid crystal is controlled so as to change a phase of the cholesteric liquid crystal in the visible ray range.

5. The liquid crystal display according to claim 4, wherein the first and second compensation films are formed of negative C-plate.

6. The liquid crystal display according to claim 4, wherein a liquid crystal mode applied to the liquid crystal layer is at least one selected from the group consisting of twisted nematic (TN) mode, optical compensated birefringence (OCB) mode, vertical alignment (VA) mode, in plane switching (IPS) mode and electrically controlled birefringence (ECB) mode.

7. An optical compensation film, comprising:
    a first alignment film on a substrate;
    a first liquid crystal layer on the first alignment film;
    a second alignment film on the first liquid crystal layer;
    a second liquid crystal layer on the second alignment film;
    a third alignment film on the second liquid crystal layer; and
    a third liquid crystal layer on the third alignment film,
    wherein the first to third alignment films have different tilt angles changed successively,
    wherein a pretilt angle of each of the first to third liquid crystal layers is set from each of the first to third alignment films,
    wherein the liquid crystal layers are formed with a multi-layered structure having at least three layers, each liquid crystal layer has a substantially fixed tilt angle, and the tilt angles of the liquid crystal layers are different from each other and change successively throughout the liquid crystal layers,
    wherein the alignment films layers are formed with a multi-layered structure having at least three layers,
    wherein the first to the third liquid crystal layers are hardened by ultraviolet light or ion beams and each of the liquid crystal layers are fixed as a film,
    wherein the liquid crystal layers include a cholesteric liquid crystal, and wherein a pitch of the cholesteric liquid crystal is controlled so as to change a phase of the cholesteric liquid crystal in the visible ray range.

8. A method of forming an optical compensation film, comprising:

forming a first alignment film on a substrate;

forming a first liquid crystal layer on the first alignment film;

forming a second alignment film on the first liquid crystal layer;

forming a second liquid crystal layer on the second alignment film, forming a third alignment film on the second liquid crystal layer; and forming a third liquid crystal layer on the third alignment film, wherein the first to third alignment films have different tilt angles changed successively, wherein a pretilt angle of each of the first to third liquid crystal layers is set from each of the first to third alignment films, wherein the liquid crystal layers are formed with a multi-layered structure having at least three layers, each liquid crystal layer has a substantially fixed tilt angle, and the tilt angles of the liquid crystal layers are different from each other and change successively throughout the liquid crystal layers, wherein the alignment films layers are formed with a multi-layered structure having at least three layers, wherein the first to the third liquid crystal layers are hardened by ultraviolet light or ion beams and each of the liquid crystal layers are fixed as a film, wherein the liquid crystal layers include a cholesteric liquid crystal, and wherein a pitch of the cholesteric liquid crystal are controlled so as to change a phase of the cholesteric liquid crystal in the visible ray range.

* * * * *